United States Patent [19]
Gardner

[11] 3,910,385
[45] Oct. 7, 1975

[54] DISC BRAKE CALIPER AND MOUNTING STRUCTURE

[75] Inventor: Richard H. Gardner, Pleasant Hill, Ohio

[73] Assignee: The B. F. Goodrich Company, Akron, Ohio

[22] Filed: Apr. 18, 1974

[21] Appl. No.: 462,026

[52] U.S. Cl. ............... 188/73.3; 188/72.4; 188/370
[51] Int. Cl.² .................................... F16D 55/224
[58] Field of Search ....... 188/73.6, 73.5, 73.3, 72.4, 188/71.1, 73.4, 18 A, 370

[56] References Cited
UNITED STATES PATENTS

| | | | |
|---|---|---|---|
| 3,361,229 | 1/1968 | Swift | 188/72.4 |
| 3,442,354 | 5/1969 | Belart | 180/72.4 |
| 3,552,527 | 1/1971 | Hayes | 188/73.3 |
| 3,625,314 | 12/1971 | Rinker | 188/73.5 |
| 3,695,398 | 10/1972 | Crawford | 188/73.6 |
| 3,782,509 | 1/1974 | Cook et al. | 188/73.5 |
| 3,782,510 | 1/1974 | Rath | 188/73.5 |

FOREIGN PATENTS OR APPLICATIONS

| | | | |
|---|---|---|---|
| 1,336,878 | 7/1963 | France | 188/72.4 |
| 321,634 | 6/1957 | Switzerland | 188/72.4 |

*Primary Examiner*—Trygve M. Blix
*Assistant Examiner*—Edward R. Kazenske
*Attorney, Agent, or Firm*—W. A. Shira, Jr.; Frederick K. Lacher

[57] ABSTRACT

A disc brake of the floating caliper type having the actuating cylinder carried by the caliper. The actuating piston is slidably supported in the torque plate for flotation of the caliper and reaction to tangential braking forces. The lining carrier on the piston side of the caliper is supported by the torque plate and resiliently retained by a spring member.

7 Claims, 6 Drawing Figures

DISC BRAKE CALIPER AND MOUNTING STRUCTURE

BACKGROUND OF THE INVENTION

A sliding or floating caliper disc brake is desirable because friction lining members may be located on both sides of the rotatable disc and only one actuating piston and cylinder assembly is needed on one side of the disc. When this type of brake is used the piston must have sufficient travel to compensate for the lining wear on both sides of the disc. The tangential torque or reaction force from the friction linings on the disc has been transmitted to a support member such as a torque plate through rods or other slidable "flotation" connections which permit axial movement of the caliper relative to the disc. These flotation connections must be placed at positions where the tangential torque forces are transmitted to the torque flange while permitting sliding movment of the caliper. The connections must also be placed so that the caliper can be installed and replaced with the minimum of time and effort. Also, periodical replacement of the friction lining carriers must be provided for. It is, therefore, important for the proper functioning of this type of caliper brake that the best type of flotation and reaction connections be used and that they be placed at the optimum locations. With a floating caliper type brake, there is also a problem obtaining a structure which does not rattle.

SUMMARY OF THE INVENTION

The present invention provides a construction in which the piston and cylinder assembly not only actuates the friction linings into and out of engagement with the brake disc but also serves as a flotation connection and obviates the necessity for other secondary flotation and reaction connections. By mounting the piston slidably in a cylindrical opening in the torque flange, the piston provides the necessary support and reaction. This construction also makes possible simple and quick installation and removal of the caliper by sliding the piston into or out of the cylindrical opening in the torque flange.

With only the one common reaction and flotation point provided by the caliper, the replacement of the friction lining carriers is facilitated. Spring steel clips can be installed to provide wearing surfaces for the torque plate and resist rattle of the brake.

The construction is also adaptable for increasing the braking capacity by adding additional modular caliper assemblies around the disc or using caliper assemblies with multiple piston cylinder assemblies. It also eliminates the difficulties of providing secondary flotation and reaction connections which have been necessary in prior floating caliper disc brakes.

DETAILED DESCRIPTION

Figure 1:
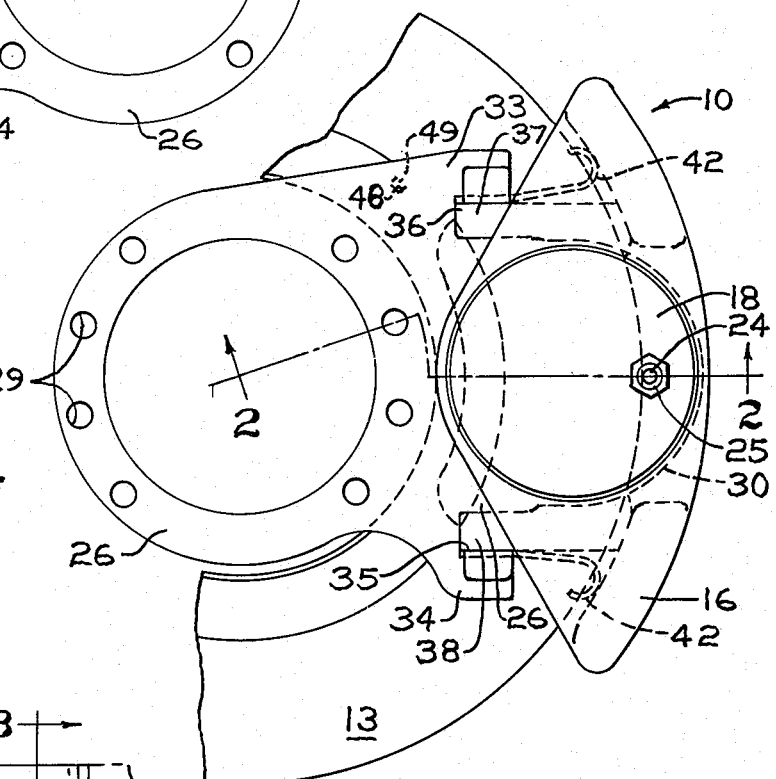
FIG. 1 is a fragmentary elevation of a caliper disc brake embodying the invention showing the piston-cylinder side of the caliper.
Figure 2:
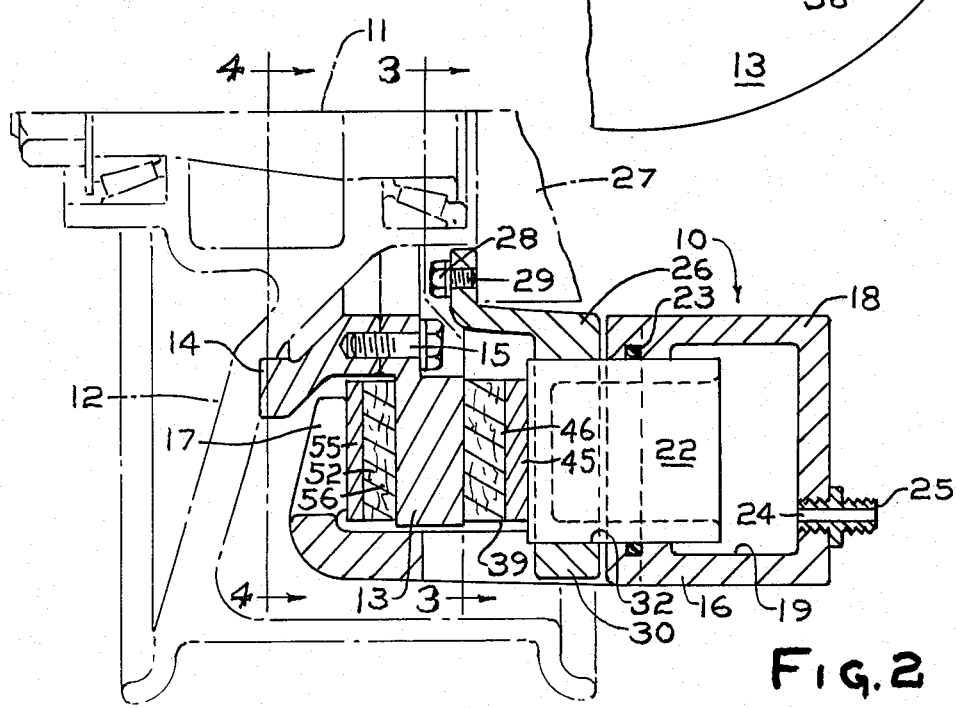
FIG. 2 is a sectional view taken along the plane of line 2—2 of FIG. 1 with the axle and wheel being shown in chain-dotted lines.

A disc brake 10 is shown in FIGS. 1 and 2 for a vehicle having an axle 11 on which a wheel 12, shown in phantom lines in FIG. 2, is rotatably mounted. A rotatable brake disc 13 which may be of steel or other wear-resistant material is carried by the wheel 12 on an annular adapter 14, shown in FIGS. 2 and 4, which has a flange abutting the wheel and connected to the wheel as by screws threaded in holes in the flange. The brake disc 13 is removably fastened to the adapter 14 by screws 15 threaded in another flange.

A unitary floating head or caliper member 16 extends axially of the disc 13 with a radially extending flange 17 overlapping one face of the disc and an integral housing 18 for a brake actuating cylinder 19 overlapping the other face of the disc. A brake actuating piston 22 is slidably mounted in the cylinder 19 for movement toward or away from the disc 13. A suitable fluid seal such as an 0-ring 23 is mounted in a groove in the cylinder 19 for sealing engagement with the piston 22. An opening 24 in the end of the cylinder 19 is provided with a nipple fitting 25 for connection to a conduit (not shown) communicating fluid under pressure to the cylinder.

A nonrotatable mounting member such as a torque flange 26 is mounted on a hub 27 of the axle 11 by a series of bolts 28 extending through holes 29 spaced circumferentially around the axle. The torque flange 26 has a radially extending piston supporting flange 30 with a cylindrical opening 32 into which the piston 22 may be slidably inserted to provide a common torque transmitting and sliding flotation connection for the caliper member 16. The torque flange 26 also has radially extending arms 33 and 34 which are circumferentially spaced apart and have seats 35 and 36 for receiving the ends 37 and 38 of a friction lining carrier assembly 39 engageable by the piston 22 for sliding movement towards and away from the disc 13.

Figure 5:
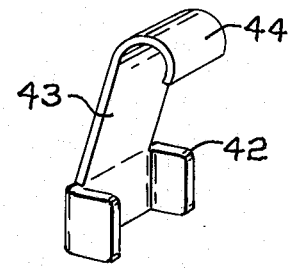
FIG. 5 is an enlarged perspective view of one of the spring clips shown in FIGS. 1 and 3.

Spring clips 42, as shown in FIG. 5, have a U-shaped end for fitting around the arms 33 and 34 and a neck portion 43 with a rounded end 44 engaging the inner surface of the caliper 16. These spring clips 42 are preferably of a wear resisting material such as spring steel to provide a wearing surface between the friction lining carrier assembly 39 and the arms 33 and 34. The rounded end 44 is in engagement with the caliper 16 and provides a resilient pressure against the ends 37 and 38 of the carrier assembly 39 to serve as an antirattle apparatus for the lining carrier assembly 39. As shown more clearly in FIG. 3, the inner edges of the ends 37 and 38 engage the seats 35 and 36 of the arms 33 and 34 while the outer edges of the ends 37 and 38 engage the caliper 16 to hold the friction lining carrier assembly 39 in position. The friction lining carrier assembly 39 has a backing plate 45 to which is integrally molded a friction lining 46.

Figure 3:
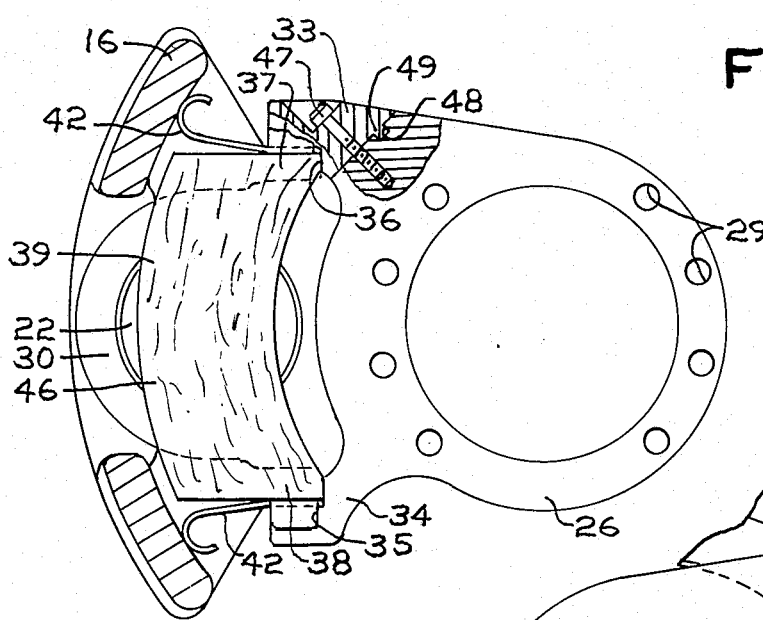
FIG. 3 is a sectional view taken along the plane of line 3—3 of FIG. 2 with parts being broken away to show the removable arm connection.

The arm 33 of the torque flange 26 is removably fastened to the torque flange as by a screw 47, shown in FIG. 3, and a mortise type connection between the arm and body of the torque flange with a groove 48 in the torque flange 26 and a rib 49 in the arm 33. By removing the screw 47 and lifting off the arm 33 along with the spring clip 42, the friction lining carrier assembly 39, engageable by the piston 22, may be removed from the brake and replaced without further disassembly. The arm 33 along with the spring clip 42 may then be replaced and the screw 47 threaded in the torque flange 26 fastening the arm again to the torque flange.

Figure 4:
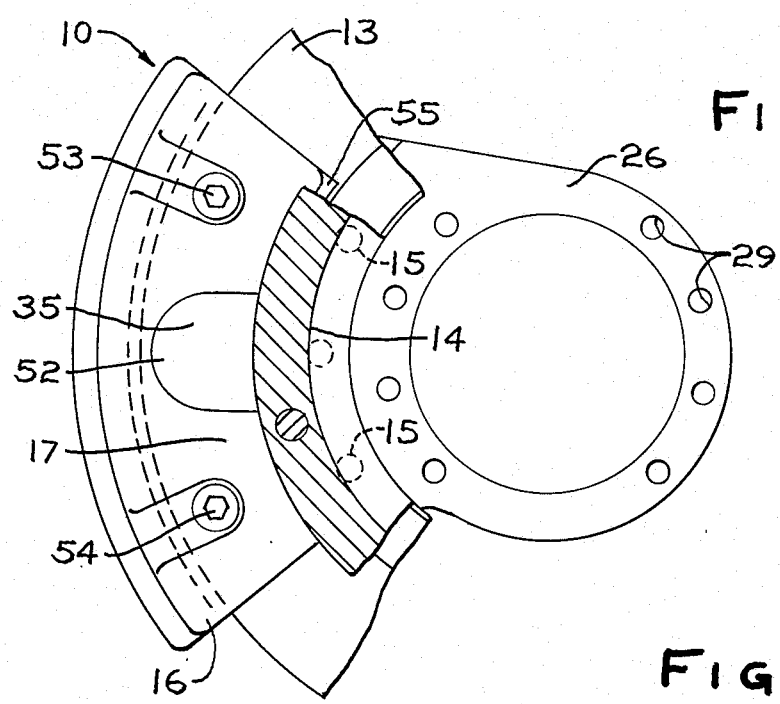
FIG. 4 is a sectional view taken along the plane of line 4—4 of FIG. 2 showing the side of the caliper opposite to the piston-cylinder side.

On the opposite side of the disc 13 from the piston 22 and cylinder 19, a second friction lining carrier assembly 52 is fastened to the radially extending flange 17 of the caliper member 16 by bolts 53 and 54, shown more clearly in FIG. 4. These bolts 53 and 54 are accessible upon removal of the wheel 12 and accordingly the second friction lining carrier assembly 52 may be replaced by removing the bolts, sliding the assembly out of the brake and replacing it with one which is not worn. The second friction lining carrier assembly 52 has a backing plate 55 which contains screw holes for receiving the bolts 53 and 54 and a friction lining 56 which may be removably fastened to the backing plate as by screws (not shown).

Assembly of the brake 10 is accomplished by mounting the torque flange 26 on the hub 27 of axle 11. The caliper member 16 with the piston 22 retracted into the cylinder 19 at a position to the far right in FIG. 2 and then moved radially into position with the disc 13 interposed between the friction lining carrier assemblies 39 and 52 and the piston supporting flange 30 interposed between the friction lining carrier assembly 39 and the housing 18. The piston 22 is then actuated to slide into the cylindrical opening 32 in the piston supporting flange 30, as shown in FIG. 2. The wheel 12 can then be mounted on the axle 11 and brake disc 13 fastened to the annular adapter 14 by screws 15. Disassembly of the brake can be accomplished by reversing this procedure.

In operation, fluid pressure is communicated to the cylinder 19 through opening 24 and piston 22 is urged towards the friction lining carrier assembly 39 into engagement with the backing plate 45. Because of the sliding engagement of the caliper member 16 on the piston 22, the radially extending flange 17 of the caliper member will simultaneously be moved into engagement with the backing plate 55 of the second friction lining carrier assembly 52 and the friction lining 46 and friction lining 56 of the carrier assemblies will be urged into braking engagement with the rotating disc 13. Resistance to turning of the caliper member 16 is also provided through the slidable connection of the piston 22 in the piston supporting flange 30. When the fluid pressure is reduced in the cylinder 19, the piston 22 will be allowed to move to the right, as shown in FIG. 2, permitting the caliper member 16 to slide to the left and the pressure against the disc 13 by friction lining 46 and friction lining 56 is released.

It can be seen that by providing a torque flange 26 having circumferentially spaced piston supporting flanges 30 and arms 33 and 34 at other positions around the axle 11, additional caliper members like caliper member 16 may be installed to provide increased brake capacity.

Figure 6:
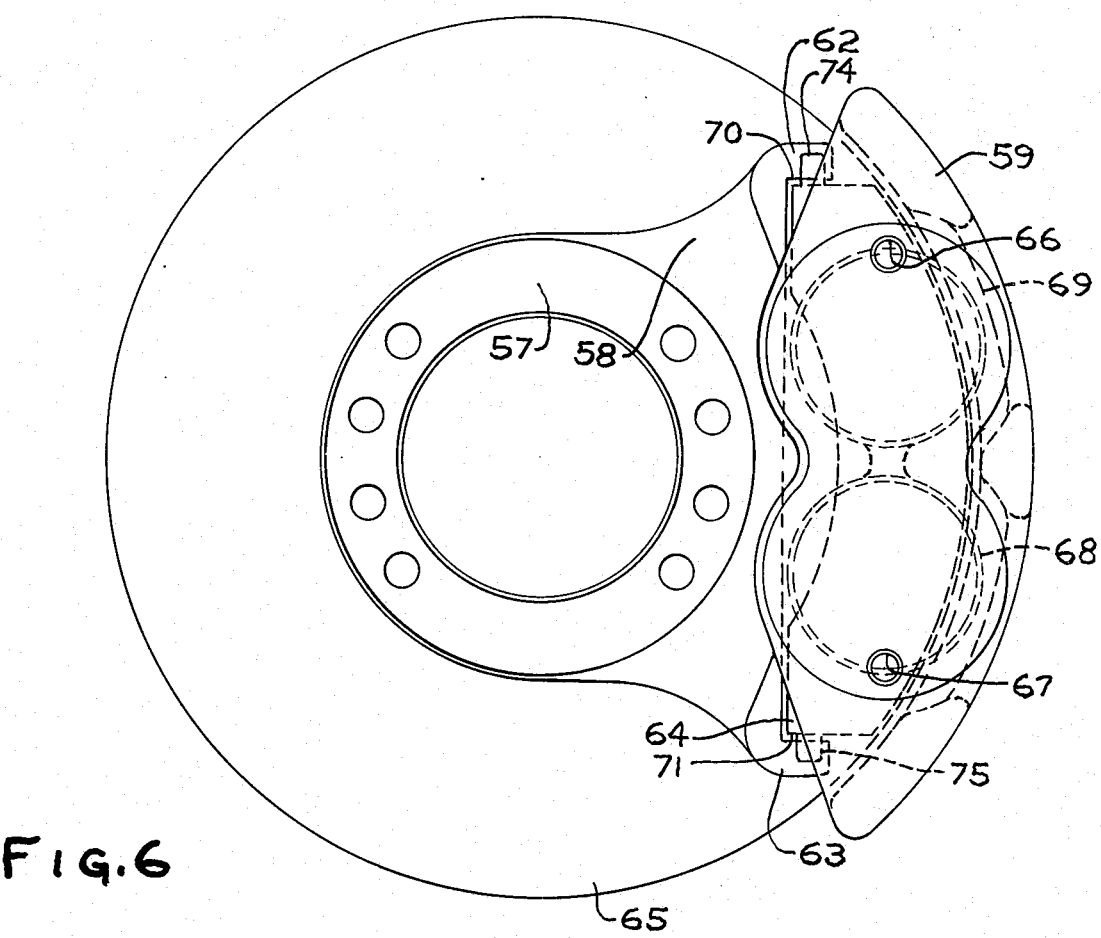
FIG. 6 is an elevation of a modification of a caliper disc brake embodying the invention having a pair of piston-cylinder assemblies.

Also, as shown in the modification of FIG. 6, a torque flange 57 may have a piston supporting flange 58 with a pair of cylindrical openings for receiving a pair of pistons in sliding engagement which are part of the piston-cylinder assembly mounted in a dual caliper member 59. Arms 62 and 63 support a friction lining carrier assembly 64 for engagement with a rotatable disc 65 on one side of the disc. The friction lining carrier assembly on the other side of the disc 65 can be identical to the friction lining carrier assembly 52 and be mounted on a radially extending flange identical to the flange 17 of caliper member 16 described hereinabove.

Openings 66 and 67 are provided in the dual caliper member 59 leading to cylinders 68 and 69 in the dual caliper member, shown in FIG. 6. The friction lining carrier assembly 64 is supported in seats 70 and 71 in the arms 62 and 63 and spring clips 74 and 75 may be provided with a U-shaped portion for embracing the arms and a spring portion for eliminating rattle from the brake. The outer edges of the friction lining carrier assembly 64 may be in engagement with the dual caliper member 59.

The operation of this modification is similar to the operation of the embodiment of FIGS. 1 through 5; however, in this case there are two pistons slidably mounted in the piston supporting flange 58 for actuating the brake and providing the flotation of the caliper member 59 as well as transferring the torque from the friction lining carrier assemblies to the torque flange 57.

Although the preferred embodiment of the invention and the modification of FIG. 6 have been shown and described for a single piston and a dual piston floating caliper brake, it will be understood that other constructions embodying the invention can be provided such as a triple piston arrangement or a number of dual piston caliper brakes located at circumferentially spaced positions around the brake disc.

It will further be understood that the invention is capable of modifications and adaptions by those having ordinary skill in the art and is more particularly defined by the appended claims.

I claim:

1. A disc brake for braking engagement with a brake disc rotatable about an axis comprising a floating caliper member extending axially of said disc, an integral housing of said caliper member overlapping a first face of said disc, a radially extending flange of said caliper member overlapping an opposite second face of said disc, said housing having an axially extending cylinder, a nonrotatable mounting member having a cylindrical opening with the same diameter as and coaxial with said axially extending cylinder interposed between said housing and said disc, a piston having a cylindrical surface of the same diameter as said cylinder slidably disposed in said cylindrical opening and in sealing, sliding engagement with said cylinder providing a connection between said mounting member and said caliper member which is the only support of said caliper member, a first friction lining carrier having a friction lining for braking engagement with said first face of said disc slidably mounted on said mounting member and engageable by said piston, a second friction lining carrier having a second friction lining for braking engagement with said second face of said disc mounted on said radially extending flange of said caliper member, fluid pressure means, means to communicate fluid under pressure connected between said cylinder and said fluid pressure means for injecting fluid under pressure into said cylinder whereby said piston is urged in one direction against said first friction lining carrier and said caliper member, including said cylinder and radially extending flange, is urged in an opposite direction providing braking pressure against said second friction lining carrier and permitting sliding movement of said caliper on said piston to adjust for wear of said first and second friction linings.

2. The apparatus defined in claim 1 wherein said mounting member is an annular torque plate for mounting on an axle of a vehicle and said rotatable brake disc is mounted on a wheel of said vehicle for rotation therewith.

3. The apparatus defined in claim 2 wherein said torque plate and said brake disc extend radially outward in a substantially parallell relationship from said axle and said caliper is located radially outward and axially over said torque plate and said brake disc.

4. The apparatus defined in claim 2 wherein said mounting member has a pair of arms for retaining said first friction lining carrier therebetween in nonrotating relation to said disc.

5. The apparatus defined in claim 4 wherein spring clips are interposed between said arms and said friction lining carrier and in engagement with said caliper member for holding said friction lining carrier in position, reducing wear and resiliently pressing against said lining carrier to reduce rattle.

6. The apparatus defined in claim 4 wherein one of said pair of arms is removably fastened to said mounting member at a position spaced radially inward from said caliper member for facilitating replacement of said first friction lining carrier in a circumferential direction.

7. The apparatus defined in claim 1 wherein said cylinder has a depth at least as deep as the length of said piston permitting movement of said piston out of said cylindrical opening into said cylinder, and said caliper member being radially movable over said mounting member and said disc during assembly and disassembly with said piston positioned in said cylinder and out of said cylindrical opening in said mounting member.

* * * * *